Sept. 14, 1948.  A. BELCHETZ  2,449,190
PROCESS FOR THE PRODUCTION OF SULFUR TRIOXIDE
Filed Aug. 3, 1945
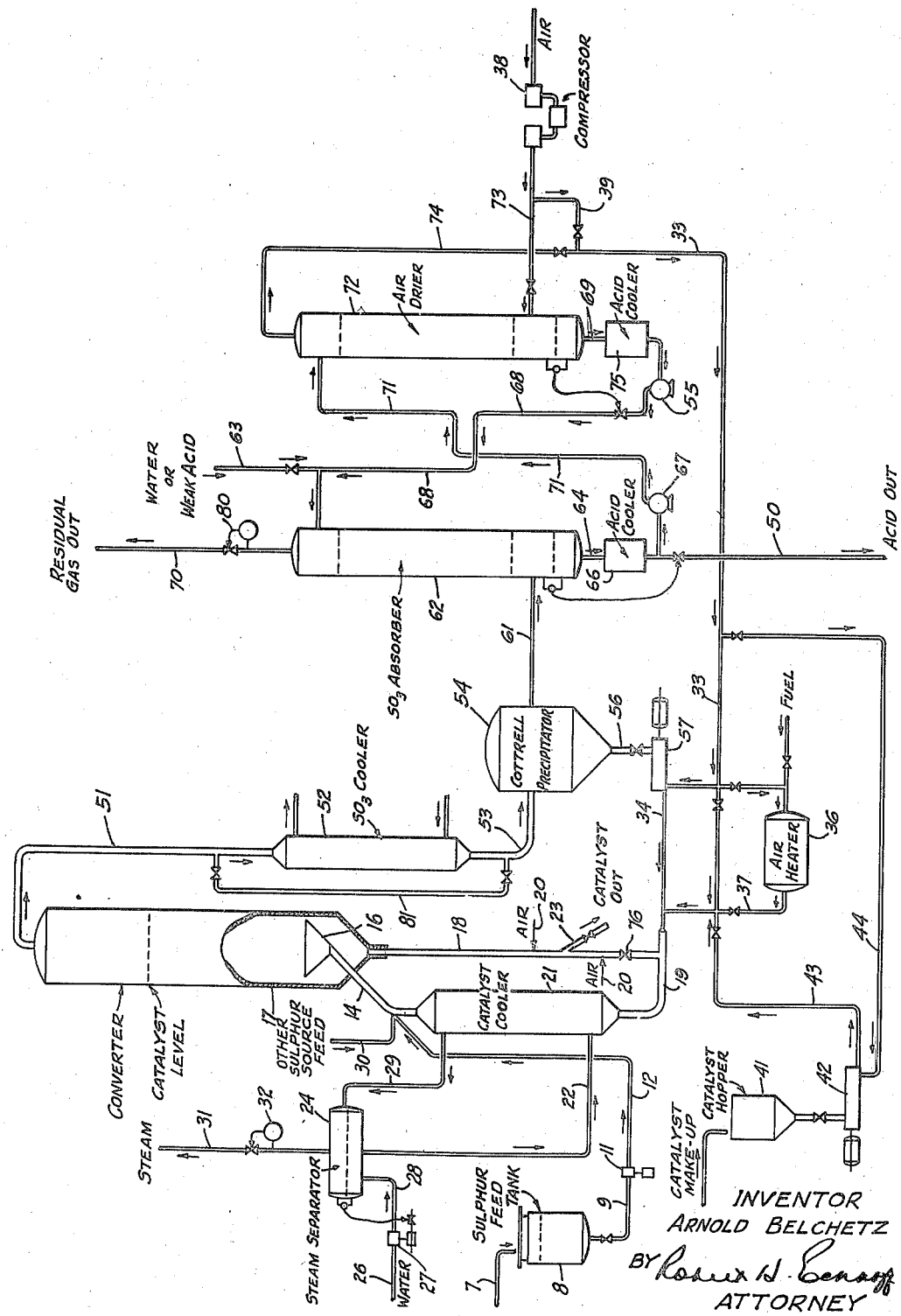
INVENTOR
ARNOLD BELCHETZ
BY Robert H. Lenoff
ATTORNEY Patented Sept. 14, 1948

2,449,190

UNITED STATES PATENT OFFICE 2,449,190

PROCESS FOR THE PRODUCTION OF SULFUR TRIOXIDE

Arnold Belchetz, Larchmont, N. Y., assignor to Stauffer Chemical Company, a corporation of California Application August 3, 1945, Serial No. 608,742

4 Claims. (Cl. 23—174)

This invention relates to the production of sulphur trioxide in a concentration suitable for manufacture of sulphuric acid or for other industrial utilization.

THE PRIOR ART

In the manufacture of sulphur trioxide for subsequent conversion into sulphuric acid from sulphur, it is usual first to burn sulphur with air to form sulphur dioxide. Subsequently, the sulphur dioxide is mixed with additional air and is then passed over a suitable catalyst to form sulphur trioxide from the air-sulphur dioxide mixture in accordance with the following reaction:

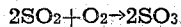

The catalyst mass represents a considerable portion of the capital investment in a sulphuric acid plant for the mass must be manufactured, conditioned for use (see Koetz Patent 1,941,557) and placed in the converters, usually by hand. The material or materials comprising the catalyst are usually disposed on particles of a carrier material, such as silica gel, diatomaceous earth, asbestos fibre, magnesium sulphate, etc. Since the catalyst is employed in a fixed or static bed, the bed must be sufficiently shallow and of sufficiently great diameter; and the carrier particles must be of a size and a shape so as to produce the least possible pressure drop in the gas stream passing through the catalyst chamber, to reduce power costs, blower costs, etc.

The reaction of $SO_2$ and oxygen to form sulphur trioxide is quite exothermic. The most favorable equilibrium for conversion of $SO_2$ to $SO_3$ is realized at about 800° F. although the rate of reaction is greater at higher temperatures. If one attempts the conversion in a single pass through the catalyst in a fixed bed, the final temperature reached will depend upon the degree of dilution of the $SO_2$ and oxygen with inert gases, such as nitrogen or carbon dioxide, and upon the inlet or threshold temperature of the gas mixture.

The usual practice is to provide the catalyst mass in at least two separate beds and to cool the gas stream between each bed. To ensure reaching equilibrium, so as to obtain maximum conversion in each pass, the several catalyst masses are made of increasing volume and depth to permit of longer contact periods as the $SO_2$ and $O_2$ concentrations decrease and the $SO_3$ concentration increases in the gas stream. A catalyst mass depth of a few inches usually suffices in the first stage of conversion, while the last stage is usually several feet in depth.

It is customary to introduce the gas at temperatures of about 750° F. to 850° F. into fixed bed converters, to ensure that the reaction will proceed at a sufficiently great rate to reach equilibrium for the reaction $2SO_2+O_2 \rightarrow 2SO_3$. The use of very shallow catalyst beds in the first and second conversion stages results in an extremely short time of contact of the gas with the catalyst, usually only a fraction of a second, so that conditions conducive to a high rate of reaction must be maintained to attain the desired conversion in these conversion stages. If the inlet temperature of the gas is reduced, the temperature reached in the converter will fall and the rate of reaction will drop. The catalyst bed will gradually become colder as the temperature of the inlet gas is decreased, and a point will eventually be reached when the conversion will become uneconomical or where the reaction may cease completely.

The equilibrium for the reaction

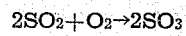

is favored by relatively low temperatures and a temperature of about 800° F. is desirable if a high conversion to $SO_3$ is desired. As the temperature of the exit gases is increased, the reaction is reversed, so that in fixed bed units it is customary to carry out the conversion in two or more stages, with intercooling between stages, to attain the desired final conversion.

The following are typical temperature conditions for a modern 3-stage fixed bed conversion unit on an inlet gas containing 9.1% $SO_2$ and wherein the final overall conversion of $SO_2$ to $SO_3$ was 98.5%:

| | ° F. Inlet Temperature | ° F. Outlet Temperature | Per cent Conversion of $SO_2$ to $SO_3$ |
|---|---|---|---|
| First Stage | 755–760 | 1,100–1,115 | From 0 to 64. |
| Second Stage | 865–880 | 1,010–1,025 | From 64 to 90.5. |
| Third Stage | 765–770 | 810–815 | From 90.5 to 98.5. |

The above figures illustrate that with normal concentration of $SO_2$ in the inlet gas, temperatures reached in fixed bed converters are too high to permit of reaching good conversions of $SO_2$ to $SO_3$ in one stage. The temperature rise could be reduced by diluting the $SO_2$ with air or flue gas, but the volumes of gases to be handled would be too great for economical operation.

It will be obvious that at the most the temperature across a static catalyst mass can only be averaged. Consequently, the usual practice is to carry out the conversion of $SO_2$ to $SO_3$ in stages with intercooling, taking most of the conversion in the first and second stages, where higher average temperatures can be tolerated, and to use the final or third stage for clean-up purposes, at a lower average temperature, to attain a high overall degree of conversion.

With the passage of time, dust and other foreign solids collect in the static catalyst beds, gradually increasing the pressure drop across the bed so that at periodic intervals the catalyst chambers are taken off stream, the catalyst removed and replaced, thus resulting in process interruption. The gas stream passed to the catalyst mass must therefore be carefully freed of solids; even with this practise, the resistance to flow of gas increases rapidly with use. To facilitate temperature regulation and to permit the catalyst mass to be freed of foreign solids, various complicated and intricate apparatus constructions have been suggested, none of which has provided a completely satisfactory solution to either problem.

THE USE OF OTHER SULPHUR SOURCE MATERIALS

So far I have mentioned only the production of sulphur dioxide from sulphur. It is also usual in the art to produce sulphur dioxide from hydrogen sulphide, hydrocarbons containing sulphur such as disulphides and thioethers, strong used sulphuric acids such as alkylation sulphuric acid sludge, alcohol acid sludge and the like, and acids or sludges having a smaller acid content such as those which result from the refining of petroleum distillates; all of these sludges result from the industrial use of the acid in manufacture of various materials by known methods. To effect decomposition, the combustible materials are burned while the so-called spent acids are heated under such conditions that the acid is decomposed to form volatile hydrocarbons, hydrocarbon gases, water, carbon dioxide and sulphur dioxide.

If any considerable quantity of hydrocarbons is present, the removal of these from the sulphur dioxide-water-carbon dioxide stream becomes a problem and the provision of hydrocarbon condensers and hydrocarbon combustion chambers ahead of the converters is usual. If the gases are subjected to combustion, the sulphur dioxide stream passing to the converters is further diluted by the carbon dioxide formed in the combustion and by nitrogen introduced with the oxygen for combustion. This increases the volume of the catalyst mass required for if a conversion of the order of 94% and better is to be secured, a necessity in any commercial operation, adequate contact time must be provided between the catalyst mass and the gas stream. Obviously, the leaner this stream is in $SO_2$, the greater will be the catalyst mass required for a given degree of conversion to produce a fixed or equal quantity of $SO_3$.

A further disadvantage, inherent in sludge decomposition plants or in plants in which hydrogen sulphide or hydrocarbons containing sulphur are burned as a source of $SO_2$, is that water is formed upon combustion of the hydrogen present in addition to the water originally present in the air. It is customary to scrub the gases formed upon sludge acid decomposition or combustion with large volumes of cold water, to condense out the bulk of the water. The gases are then thoroughly dried after cooling, by scrubbing with acid to remove the last traces of moisture. The dry gas stream is then permitted to enter the converters for conversion of $SO_2$ to $SO_3$. The product gases leaving the converters can now be cooled and the $SO_3$ absorbed in 98.5% $H_2SO_4$ without danger of condensing water containing $SO_3$ or $SO_2$ which would be extremely corrosive. The complete drying of the gas before entering the converters is also regarded as necessary to avoid the formation of troublesome acid mists.

THE PRESENT PROCESS

In accordance with this invention, all of the foregoing difficulties are obviated while a simpler, more direct and less involved process is provided. Broadly, the invention contemplates combustion of one or more sulphur source materials in the presence of catalyst for the oxidation of $SO_2$ to $SO_3$, the catalyst being present as a suspension in the air or oxygen containing gas required for oxidation of the sulphur to $SO_2$ and $SO_2$ to $SO_3$. The process of the present invention contemplates the mixing of the catalyst and air or oxygen containing stream with the sulphur (air is used herein and in the claims as referring to a gas containing sufficient oxygen to be useful in process; it therefore includes air, pure oxygen, air enriched with oxygen or a gas containing sufficient oxygen in the presence of one or more other components which do not interfere with the oxidation). The catalyst is preferably utilized to introduce heat into the sulphur source material to assist in vaporization thereof and to promote primary combustion to form sulphur dioxide. The same catalyst then serves to promote the secondary oxidation of the $SO_2$ to $SO_3$, in the presence or absence of carbon dioxide or water, thus simplifying the process and the apparatus employed. One is thus able to provide a single compact plant capable of operating upon any one of various sulphur source materials, or combinations of these, to produce sulphur trioxide in a concentration suitable for production of sulphuric acid. Temperature control in the conversion zone is effected by recycle of a cooled stream of catalyst suspended in air or oxygen containing gas. Sufficient heat is stored in the cooled catalyst stream to effect instantaneous vaporization or decomposition of the sulphur source material, which is injected into the stream of cooled catalyst suspended in air or oxygen containing gas. Primary combustion of the sulphur to $SO_2$, carbon to $CO_2$ and hydrogen to water, will be effected in an extremely short period of time, followed by the slower secondary oxidation of $SO_2$ to $SO_3$. The total heat removed from the mixture of hot recycle catalyst and air or oxygen containing gas must equal the total heat liberated in excess of that quantity required to bring the products of combustion and oxidation to the conversion temperature maintained in the conversion zone. The excess heat evolved in conversion of the sulphur to sulphur dioxide, of the sulphur dioxide to sulphur trioxide and from the combustion of the hydrogen and carbon present, can be utilized for production of steam required in the process for driving pumps, compressors, etc. Ordinarily, the heat available from combustion of any hydrogen and carbon present and upon formation of sulphur trioxide, while sufficient to require cooling, is not put to any practical use. By having these available in one reaction zone, the process of this invention enables a maximum of heat recovery either as such or for utilization in the vaporization and combustion of additional sulphur source material.

The quantity of catalyst circulated is dictated by the heat liberated and the temperature control required in the conversion. The catalyst is usually disposed on a suitable carrier such as diatomaceous earth, kaolin, asbestos fibre, and the like, the useful carriers being well known in the art. If necessary a solid diluent, consisting of some inert material, can be added to the catalyst, to serve as a heat control and a heat abstraction medium, diluting the catalyst and taking up the heat of combustion and of conversion.

While it is known that use of an elevated pressure provides a more favorable equilibrium for conversion of $SO_2$ to $SO_3$, so far as I am aware no one has as yet been able to provide a practical process capable of operation at pressures up to 300 pounds gauge. The process of this invention is particularly suited to operation at a pressure elevated above atmospheric although such operation is not a necessity.

It is in general the broad object of the present invention to provide a novel process for the manufacture of sulphur trioxide from suitable sulphur source materials.

Another object of the present invention is to provide a novel process in which sulphur trioxide is manufactured from a sulphur source material and air in the presence of a finely divided catalyst present in gaseous suspension and utilized to control combustion and conversion temperatures.

A further object of this invention is to provide a fluid catalyst process for manufacture of sulphuric acid utilizing a suitable catalyst to control combustion and conversion temperatures.

A still further object of the invention is to provide a fluid catalyst process utlizing a suitable catalyst for manufacture of sulphur trioxide from a suitable sulphur source material and which is carried on at an elevated pressure.

The invention includes other objects and features of advantage, some of which, together with the foregoing, will appear hereinafter, wherein the present preferred manner of practising the invention is disclosed. The single figure in the drawing accompanying and forming a part hereof is a diagrammatic apparatus representation and a flow sheet useful in practising the invention.

APPARATUS

Referring to the flow sheet, the apparatus there shown includes a molten sulphur feed pipe 7, delivering sulphur in a liquid state to sulphur feed tank 8. The molten sulphur is withdrawn from this tank throught pipe 9 and is discharged by pump 11 through pipe 12 into another pipe 14 which extends through the bottom of the converter 17 and discharges into the apex of an open cone 16. A standpipe 18 is provided at the bottom of chamber 17 extending downwardly from the chamber 17 to another pipe 19 which leads to catalyst cooler 21. Catalyst in an aerated condition flows from the bottom of the converter 17 through the flow control valve 76 into the line 19. A side outlet pipe 23 is provided on pipe 18 to permit withdrawal of catalyst as desired while several pipes 20 permit air to be introduced into the standpipe 18 when required to maintain the catalyst in the standpipe in an aerated condition and to control the density of the catalyst flowing down the standpipe 18.

A suitable heat exchange fluid such as water is introduced when the apparatus is in operation into the catalyst cooler 21 through inlet pipe 22 from steam separator 24. Water is injected into the steam separator 24 from inlet pipe 26 by pump 27 through line 28. Heated water and steam are removed from the catalyst cooler 21 through pipe 29 and steam is removed from the steam separator 24 through pipe 31 under the control of pressure regulating valve 32.

Air is admitted from pipe 33 into pipe 34 connected to pipe 19. If desired, as in starting up the unit, the air can be passed through air heater 36 and thence through line 37 into line 34, suitable valves being provided for bypassing the air heater when the apparatus is operating normally. Air is supplied to pipe 33 by air compressor 38 either direct through line 39 to pipe 33 or from the presently described air dryer 72 through line 74.

For the initial catalyst addition or to replace catalyst lost or deactivated in the operation, the catalyst is charged into a catalyst hopper 41 and discharged by means of a screw pump 42 into line 43, air being supplied by pipe 44 from pipe 33 to convey the catalyst through pipe 43 and into pipe 19.

The great bulk of the catalyst injected into converter 17 through line 14 separates from the gases before passing out of the converter, a level of catalyst in a fluidized condition being maintained in converter 17. When operating on sulphur, the gaseous products and catalyst fines not separated in converter 17, are removed from the top of converter 17 by pipe 51 directly into a sulphur trioxide cooler 52 and by-pass 81 is not employed. The gas stream from cooler 52 is passed through pipe 53 into a suitable dust separating unit which I have indicated at 54 as a Cottrell precipitator, one of the electro-static type, to remove what catalyst fines are present. As previously mentioned, the bulk of the catalyst remains in the converter 17 and flows through the standpipe 18 for recirculation. The precipitator delivers the separated fines to a pipe 56 and into a screw pump 57 whence they are picked up by air delivered from pipe 33 and conveyed through pipe 34 into pipe 19. The gaseous products, freed of catalyst fines, pass through pipe 61 into the sulphur trioxide absorber 62, into which water or dilute acid is admitted from line 63.

Catalyst can be withdrawn through pipe 23 and fresh catalyst added as desired from hopper 41. The catalyst need not be especially formed into special shapes or sizes, but should be fine enough to permit of its being fluidized. The catalyst should preferably be fine enough to pass through a 200-mesh screen, but should contain only a small percentage of material of less than 10 micron particle size so as to avoid excessive carry-over of fines from vessel 17. The catalyst can be conditioned in the converter and need not be first externally heated in an $SO_2$ atmosphere, as is usually required in preparing fixed bed catalyst. The process also enables the catalyst to be employed at a pressure elevated above atmospheric and favorable to the formation of $SO_3$ at the temperature of operation. Operation at elevated pressures is not feasible in present known processes. Although pressures as high as 300 pounds gauge are practical, I prefer to use pressures below 100 pounds gauge and preferably between 1 pound and 60 pounds gauge.

Acid is withdrawn through line 64 at the base of the absorber 62 and is passed through acid cooler 66. From the cooler, a portion of acid is drawn off as product acid through line 50. Another portion is circulated by pump 67 through pipe 71 to the air drying tower 72. Acid is drawn off at the base of the tower 72 through pipe 69 into cooler 75 and is then circulated by pump 55 through line 68 to the absorber 62. Pipe 73 admits air from the air compressor 38 to the air dryer 72. The air issues from the dryer into line 74 connected to pipe 33. Residual gas is released from absorber 62 through pipe 70 under the control of pressure regulating valve 80.

OPERATION ON SULPHUR

To bring the aparatus into operation, the air dryer 72 is by-passed and air from the compressor is discharged directly to the air heater 36. In this, fuel is burned to raise the temperature of the air to about 1000° F. The preheated air is then passed through the catalyst cooler (to which water is not admitted until later), the converter, the sulphur trioxide cooler and the Cottrell precipitator until the system is above the temperature at which moisture can condense. When this has been attained, the catalyst, in finely divided form, is gradually delivered by screw pump 42 from the catalyst hopper 41 into the air stream 44 and the suspended catalyst mixed with preheated air from line 37 and conveyed through the catalyst cooler 21 into the converter 17. Addition of catalyst is continued until the desired level has been built up in the converter 17. The catalyst is circulated with the preheated air stream until a temperature of the order of 800° F. has been reached in the entire system. During the whole of this preheating period, air leaving the Cottrell precipitator is discharged directly to the atmosphere instead of passing through the sulphur trioxide absorber. As an alternative, the sulphur trioxide absorber can be emptied of acid and the air can be allowed to pass through the absorber to the atmosphere.

When the system has been brought to proper temperature, the air heater 36 is by-passed, sulphur injection is started and water circulation through the catalyst cooler is commenced. Circulation of catalyst and water through the cooler 21 is regulated to remove the excess heat of reaction and to control the temperature in the converter to secure the greatest $SO_3$ content in the gases passing through line 51. The air from the compressor 38 is passed through the air dryer 72. The gases leaving the converter pass through the $SO_3$ cooler 52 wherein their temperature is reduced from 750° F. to 300° F. The gas stream passes through the Cottrell precipitator and the clean reaction products enter the $SO_3$ absorber 62 where the $SO_3$ is absorbed in 98% $H_2SO_4$. The residual unabsorbed gases are released to the atmosphere from the absorber at a pressure of about 40 pounds gauge through pipe 70. Acid coolers 66 and 75 remove the heat of absorption of $SO_3$ and moisture in the acid streams.

*Example I*

In one installation, operating with liquid sulphur injection and a catalyst composed of a mixture of finely divided diatomaceous earth impregnated with vanadium pentoxide and potassium sulphate, liquid sulphur was injected by pump 11 into pipe 14 at 250° F. and at a rate of 3,085 pounds per hour. The dry air supplied from tower 72 was sufficient to supply a 10% excess of oxygen over that required for conversion of the sulphur to $SO_2$ and the $SO_2$ to $SO_3$. The heat liberated by combustion of the sulphur to $SO_2$ would have been sufficient to raise the temperature of the gas to above 2000° F. if no catalyst were present to absorb the liberated heat. However, the catalyst was circulated at a rate of 500,000 pounds per hour to maintain a temperature of 750° F. in the converter, a 98% conversion of $SO_2$ to $SO_3$ being obtained. A catalyst concentration of 3.42 pounds per cubic foot of gas entering the catalyst cooler was maintained, the temperature of the mixture entering the cooler being 716° F. at 48.4 pounds gauge pressure. The outlet temperature from the catalyst cooler was 610° F. I have found this catalyst loading to be suitable for an operation of this type. The catalyst cooler produced 12,400 pounds per hour of steam at 150 pounds gauge pressure, the cooling duty being 12,720,000 B. t. u. per hour. The composition of the gas passing through pipe 51 was as follows:

| | Mol per cent |
|---|---|
| Oxygen | 2.0 |
| Nitrogen | 84.3 |
| Sulphur dioxide | 0.3 |
| Sulphur trioxide | 13.4 |
| | 100.0 |

111 tons of 100% sulphuric acid were produced per 24-hour day in this operation.

The apparatus is quite simple as compared with the usual sulphuric acid plant. For example, the converter, in the operation described, consisted of a cylindrical, unlined steel vessel 6 feet in internal diameter and 30 feet high, while standpipe 18 was 12 inches in diameter and 30 feet long; the catalyst cooler was made of 1-inch tubes, 16 feet in length. Except for the $SO_3$ absorber, which was lined with acid brick in the usual manner, and the air heater, which was lined with fire brick, the entire plant was made of ordinary unlined mild steel.

The fluidized catalyst bed extended approximately 20 feet above the bottom of the chamber, the superficial gas velocity in the chamber being 1.5 feet per second and the catalyst density approximately 15 pounds per cubic foot. The gas contact time was approximately 13 seconds, a very substantial increase in contact time over that normally provided in the usual contact plant, ensuring attainment of equilibrium and substantially complete conversion. A gas velocity of about 30 feet per second is maintained in the piping through which suspended solids are conveyed. A solids loading of about 3.4 pounds per cubic foot is maintained in the air stream in pipe 19, the catalyst-air stream flowing at the rate of 30 feet per second. A catalyst concentration of about 25 pounds per cubic foot is maintained in standpipe 18. The length of standpipe 18 is such that with a catalyst density of about 25 pounds per cubic foot in the standpipe, pressure built up by the downward flowing catalyst will be sufficient to maintain a pressure differential of one to two pounds across catalyst flow control valve 76, to prevent air backing up from line 19 into the standpipe 18.

CATALYST CIRCULATION

In order to keep the temperature of the gas down to a point at which high conversion of $SO_2$ to $SO_3$ will occur, it is necessary to circulate the cooled catalyst in sufficient quantity to take up the heat liberated in the combustion of the sulphur to $SO_2$ and in the oxidation of the $SO_2$ to $SO_3$. The quantity of catalyst which must be circulated will depend upon the temperature which it is desired to hold in the converter and the extent or temperature to which the circulated catalyst is cooled. Thus, supposing it is desired to hold a temperature of 750° F. in the converter, then if the circulated catalyst is cooled to 600° F., twice as much catalyst must be circulated as would be the case if the catalyst were cooled to 450° F. Another extremely important feature is the temperature which it is desired to hold in the converter. Thus, if the converter temperature is held at 900° F., the reaction products will remove a greater proportion of heat than would be the case if the converter temperature were held at 750° F. The amount of heat which is removed by the reaction products will also depend upon the degree of dilution of the $SO_3$ with nitrogen and oxygen. Thus, a more dilute gas will remove a greater proportion of the liberated heat than will a more concentrated gas. For this reason, it is difficult to draw an empirical equation governing all situations and all operations, since there are so many variables. For this reason, I wish to point out the range of reaction temperatures, the range of proportions of liberated heat removed by the reaction products and the range of weight ratios of catalyst circulated to sulphur charged. The ranges applicable to sulphur will become apparent from the following:

| Converter Temperatures | 750° F. | | 900° F. | | 1100° F.[1] | |
|---|---|---|---|---|---|---|
| Percent $SO_2$ in gas immediately after combustion of sulphur | 12.75 | 8.0 | 12.75 | 8.0 | 12.75 | 8.0 |
| Percent Heat of Reaction removed by Reaction Products | 20 | 33 | 25 | 41 | 32 | 48 |
| Percent Heat of Reaction removed by Cooling of Catalyst | 80 | 67 | 75 | 59 | 68 | 52 |

| Temperature to which circulated Catalyst is cooled | Pounds of Catalyst circulated per pound of sulphur injected | | | | | |
|---|---|---|---|---|---|---|
| 600° F | 120 | 100 | 54 | 44 | 30 | 21 |
| 450° F | 60 | 50 | 40 | 33 | 24 | 17 |
| 300° F.[2] | 40 | 33 | 27 | 22 | 18 | 13 |

[1] 1100° F. is too high a converter temperature for good efficiency, unless a second or clean-up converter is used in line 61 ahead of absorber 62.
[2] Cooling of the catalyst to 300° F. is considered impractical.

One can apply a formula to the situation and the following may be helpful in determining the catalyst to sulphur feed ratio:

Let

H = heat liberated in oxidizing 1 pound of sulphur to $SO_3$ (as B. t. u.).
h = heat removed by reaction products (as B. t. u. per pound sulphur oxidized to $SO_3$).
$T_1$ = converter temperature (in ° F.).
$T_2$ = temperature to which recirculated catalyst is cooled (° F.)
S = specific heat of catalyst (about 0.23).

Then neglecting heat lost by radiation to the atmosphere, which will be small for an insulated system, R = pounds catalyst circulated per pound of sulphur oxidized to $SO_3$.

$$R = \frac{H-h}{(T_1-T_2)S}$$

Sufficient catalyst must be circulated to ensure that adequate heat abstraction can be made from the catalyst mass to the end that the temperature in the converter does not exceed that at which the maximum conversion is attained for the operating pressure and the $SO_2$ and $O_2$ concentrations. Since the weight of catalyst circulated can be readily controlled relative to the quantity of sulphur fed, the catalyst quantity can be adjusted with preciseness until the maximum conversion efficiency is secured.

In the case of sulphur, the catalyst-sulphur feed ratio should be adjusted to maintain the converter temperature between 600° F. to 1200° F. and preferably between 700° to 1000° F. The exact temperature can be readily controlled by adjusting the catalyst withdrawn, cooled and returned to secure the highest conversion efficiency. Generally, with commercially useful catalysts the weight ratio of catalyst circulated to sulphur injected should be in excess of 10 to 1 and the reaction products should not remove more than 75% of the total heat liberated in converter 17.

Consideration of the following operations on an alcohol spent acid and other sulphur source materials will further illustrate the practice and utility of the invention.

Example II

A spent alcohol sulphuric acid was injected through line 30, the acid containing 78% $H_2SO_4$, 0.35% hydrocarbons (as $CH_2$) and 21.65% water. 40.2 pounds of sulphur were also injected through line 30 into line 14 for each 100 pounds of spent alcohol acid. The acid can be introduced directly into the reactor, if desired. The product from the reactor contained equimolar proportions of sulphur trioxide and water to form 100% sulphur acid. Operating upon this basis, a total of 198.3 tons per day of 100% sulphuric acid were produced of which 78 tons per day or 39.3% were provided by the spent alcohol acid and 120.3 tons or 60.7% were produced from the sulphur. When the spent alcohol acid was injected at 100° F. and the converter operated at 750° F., the excess heat removed by cooling the recirculated catalyst amounted to 4,570,000 B. t. u. per hour.

It should be emphasized in this example that the spent alcohol acid does not contain sufficient combustible material to provide the heat necessary to vaporize the spent alcohol acid and superheat the vapors to 750° F. Since at 750° F. the sulphuric acid will be almost completely dissociated to $SO_3$ and $H_2O$, the additional heat of dissociation and the heat of vaporization and superheat must be provided by combustion and oxidation of the sulphur injected.

When operating with a mixed sludge-sulphur feed, it is essential that the catalyst fines be removed before the reaction gases are cooled to a point where sulphuric acid condenses. For example in the operation with the mixed alcohol acid-sulphur feed, if the converter is held at 44.1 pound gauge outlet pressure, the partial pressure of $SO_3$ and $H_2O$ is 19.5 pounds absolute or 4.8 pounds gauge. At this partial pressure, sulphuric acid begins to condense at 650° F. If the converter is operated at 750° F. it is obviously necessary to remove the catalyst fines from the reaction products before any substantial cooling of these gases is effected. To effect this, by-pass 81 is provided around the $SO_3$ cooler and the reaction products are passed directly to the Cottrell precipitator for removal of the catalyst fines. When this is achieved, the gas is then passed into the sulphur trioxide absorber which, in this case, functions primarily as a sulphuric acid condenser.

While in the foregoing I have mentioned that the proportion of sulphur to sludge was such as to provide equimolar proportions of $SO_3$ and $H_2O$, so that the resulting product, upon condensation, was 100% acid, this is not necessary and one can use other proportions. However, if the proportion of the sludge be increased, then the water content of the reaction products will be increased and the acid may require fortification with $SO_3$ to produce 98.5% acid or stronger acid. Conversely if it is desired to produce oleum, the proportion of alcohol sludge acid to sulphur injected should be reduced.

HYDROCARBON COMBUSTION

The combustion of the hydrocarbons does not present any particular problem if a vanadium oxidation catalyst is utilized, for such a catalyst promotes oxidation of hydrocarbons to $CO_2$ and water. Thus, while in other processes extremely high temperatures (1000° F.–1600° F.) are required to decompose a sludge, total sludge decomposition and combustion can be effected in the present case at temperatures in the range of $SO_2$ conversion to $SO_3$, due to the presence of the vanadium oxidation catalyst. These are somewhat unique in this respect, being effective in aiding these oxidation reactions in the temperature range required for $SO_2$ oxidation. To illustrate, reference should be made to the following illustrative practice on an alkylation sludge, the spent acid remaining after utilization as a catalyst for alkylation of olefines with isoparaffins. The useful catalysts will be presently discussed under "Catalysts."

Example III

An alkylation acid sludge, containing 87% $H_2SO_4$, 8% hydrocarbons (as $CH_2$) and 5% water, was introduced continuously with the sulphur, the rates being 100 tons per day of the sludge and 27.2 tons per day of sulphur. From this operation, 170.3 tons per day of 100% $H_2SO_4$ were recovered, while 11,850,000 B. t. u. per hour excess heat was removed by cooling the recirculated catalyst.

Injection of the sulphur is not necessary for the decomposition of alkylation sludge acid, since the heat liberated in combustion of the hydrocarbons will be sufficient to vaporize the sulphuric acid and water present, superheat the vapors to 750° F. or 900° F., if desired, and dissociate the sulphuric acid completely to $SO_3$ and $H_2O$. If sulphur is not injected with the sludge acid, the sulphuric acid will be recovered in a strength below 98.5% and will require fortification with $SO_3$ before being reused for alkylation purposes.

WEAK ACID SLUDGE

As the hydrocarbon content of the sludge increases, the acid strength generally decreases. The volume of carbon dioxide, water and nitrogen formed on decomposition and burning of the hydrocarbons increases and the handling of a large volume of gas becomes necessary. Since the exothermic heat liberated by the combustion of the hydrocarbons becomes greater as the proportion of hydrocarbons increases, a greater circulation of catalyst is required with increased cooling for temperature control. The $SO_2$ content of the gases is small compared with gases from combustion of other sulphur source materials. It is accordingly preferable to burn sulphur with a sludge of this type and thus insure recovery of an acid of useful strength, since the combustion of hydrogen in the sludge produces a large proportion of water vapor. To illustrate operation on a sludge of this character, the following example is given.

Example IV 46.0 tons per day of a pressure distillate sludge (42.3% $H_2SO_4$, 50.5% hydrocarbons as $CH_2$ and 7.2% water) were injected together with 58.8 tons per day of sulphur. The converter was operated at 44.1 pounds gauge outlet pressure and at a temperature of 750° F. The sludge-sulphur quantities were chosen to provide equimolar quantities of $SO_3$ and water to form 100% acid. 200 tons of 100% acid were recovered per day and 54,200,000 B. t. u. per hour were removed in the catalyst cooler by cooling the catalyst to 60° F.

SUMMARY

In the following table are set forth certain pertinent data and apparatus details. These are given on a common basis, production of 200 tons of 100% acid per day:

| Charge | Case 1, Sulphur Only | Case 2, Sulphur-Spent Alcohol Acid | Case 3, Sulphur-Spent Alkylation Acid | Case 4, Sulphur PD Sludge |
|---|---|---|---|---|
| Composition of Spent Acid: | | | | |
| Per cent $H_2SO_4$ | | 78.0 | 87.0 | 42.3 |
| Per cent $CH_2$ | | 0.53 | 8.0 | 50.5 |
| Per cent $H_2O$ | | 21.65 | 5.0 | 7.2 |
| Feed rate, Sulphur, tons/day | 66.7 | 40.5 | 31.9 | 58.8 |
| Feed rate, Spent Acid, tons/day | | 101.0 | 117.2 | 46.0 |
| Total 100% $H_2SO_4$ Produced, tons/day | 200 | 200 | 200 | 300 |
| Operating Pressure, lbs./gal | 44.1 | 44.1 | 44.1 | 44.1 |
| Converter Temp., °F | 750 | 750 | 750 | 750 |
| Converter Diameter, I. D. | 8'3" | 7'3" | 8'3" | 11'0" |
| Converter Length | 30' | 30' | 30' | 30' |
| Circulation rate of Catalyst, pounds/hr | 900,000 | 180,000 | 550,000 | 2,130,000 |
| Air required, pounds/hr. (10% excess) | 39,300 | 24,300 | 31,700 | 52,400 |
| Catalyst Cooler—Outlet Temperature, °F | 610 | 610 | 610 | 610 |
| Excess heat to be removed by cooling catalyst, B. t. u./hr | 22,900,000 | 4,600,000 | 13,900,000 | 54,200,000 |
| Cooling Duty on Reaction Products, 750° F. to 60° F., B. t. u./hr | 13,100,000 | 18,700,000 | 20,000,000 | 24,500,000 |
| Per cent $H_2SO_4$ from Sulphur | 100.0 | 60.7 | 49 | 90.3 |
| Per cent $H_2SO_4$ from Spent Acid | | 39.3 | 51 | 9.7 |

CATALYST

Oxidation of sulphur to sulphur dioxide proceeds rapidly at all temperatures useful in the subsequent oxidation of sulphur dioxide to sulphur trioxide. However, the latter oxidation proceeds slowly in the abence of a catalyst. Also, while high temperatures increase the reaction rate, the equilibrium for this reaction is most favorable at relatively low temperatures and generally a temperature of 1000° F. is too high for commercial operation, resulting in too low a conversion. It is, therefore, a prerequisite that the catalyst be effective to promote the oxidation of $SO_2$ to $SO_3$ at a temperature at which the equilibrium is above 90% for $SO_3$ and preferably is as close to 100% as possible. The useful catalysts are generally provided by platinum or vanadium, for these are the only elements thus far adapted industrially and capable of effecting oxidation of $SO_2$ rapidly at temperatures well below 900° F.

Platinum is usually disposed on a suitable carrier such as asbestos, diatomite, silica gel or magnesium sulphate. Since platinum is poisoned easily it can only be utilized with sulphur of a suitable grade, while it is too expensive to be practical for an operation wherein acid sludges and like materials are used, owing to the danger of poisoning the catalyst with impurities in the sludges.

The vanadium catalysts include generally a mixture of vanadium pentoxide, reactive silica and an alkali salt such as potassium sulphate, the mixture being disposed on a suitable carrier which may provide the required reactive silica. The manufacture of catalysts including vanadium is well known and one may refer to Slama-Wolff Patent Re. 19,282 (Example 2 thereof) and to such patents as 1,657,753, 1,675,754, Re. 18,380, 1,675,330, 1,694,123 and 1,709,853. Various catalyst carriers and catalyst modifications are shown in Patents 1,463,206, 1,683,694, 1,695,740, 1,862,825 and 1,880,678.

Another catalyst mentioned in the literature is iron oxide, although oxides of other metals such as chromium, manganese, thorium, tin, titanium and tungsten are mentioned. Iron oxide is only effective at a temperature of 1200° F. and above, where the equilibrium is quite unfavorable (according to Fairlie, Sulphuric Acid Manufacture, Reinhold, 1936, page 43, only about 62% conversion can be attained at this temperature). While the use of iron oxide in the process is not impractical, it would be necessary to use it only for the first conversion stage and to interpose one or more fixed catalyst beds between precipitator 54 and absorber 62 and to employ a catalyst (such as vanadium or platinum) promoting the reaction at a temperature whereat a more favorable equilibrium could be attained. In case one or more fixed catalyst beds are used, suitable coolers should be provided.

The catalyst employed does not provide any limitation on the process. One can utilize any catalytic material which promotes the reaction at a temperature favorable to the equilibrium providing that (a) the material is not poisoned, as platinum may be, (b) the material does not interfere with the process in some way and (c) the material does not interfere with utilization of the sulphur trioxide or the acid.

EXTRANEOUS SULPHUR DIOXIDE

If a gas containing a useful concentration of sulphur dioxide is available from another source, e. g., the roasting of pyrites, this can be utilized to advantage, being injected directly into converter 17, through line 30 or else mixed with the air stream employed to pick up the catalyst. To realize the full benefit of the process, the sulphur dioxide furnished from an extraneous source should provide only a minor portion of that converted to sulphur trioxide and the major portion of the sulphur dioxide converted to sulphur trioxide should be generated in the system and in the presence of the catalyst.

I claim:

1. A process for producing $SO_3$ comprising injecting a material from the group consisting of sulphur, waste sulphuric acid and mixtures thereof into a reaction zone, introducing solid particles of a vanadium oxidation catalyst and air into said zone to maintain a catalyst bed in fluidized suspension therein, the quantity and temperature of catalyst introduced being sufficient to maintain said zone at a temperature in the range of 600°–1100° F. and conducive to oxidation of $SO_2$ to $SO_3$, removing a stream of catalyst from said zone, cooling the removed catalyst stream, and returning at least a portion of the cooled catalyst stream with additional air.

2. A process for producing $SO_3$ comprising injecting a material from the group consisting of sulphur, waste sulphuric acid and mixtures thereof into a reaction zone, introducing solid particles of a vanadium oxidation catalyst and air into said zone to maintain a catalyst bed in fluidized suspension therein, the quantity and temperature of catalyst introduced being sufficient to maintain said zone at a temperature in the range of 600°–1100° F. and conducive to oxidation of $SO_2$ to $SO_3$.

3. A process for producing $SO_3$ comprising injecting a material from the group consisting of sulphur, waste sulphuric acid and mixtures thereof into a reaction zone, introducing air and solid particles of an oxidation catalyst for sulphur and hydrocarbons into said zone to maintain a catalyst bed in fluidized suspension therein, the quantity and temperature of catalyst introduced being sufficient to maintain said zone at a temperature in the range of 600°–1100° F. and conducive to oxidation of $SO_2$ to $SO_3$, removing a stream of catalyst from said zone, cooling the removed catalyst stream, and returning at least a portion of the cooled catalyst stream with additional air.

4. A process for producing $SO_3$ comprising injecting a material from the group consisting of sulphur, waste sulphuric acid and mixtures thereof into a reaction zone, introducing air and solid particles of an oxidation catalyst for sulphur and hydrocarbons into said zone to maintain a catalyst bed in fluidized suspension therein, the quantity and temperature of catalyst introduced being sufficient to maintain said zone at a temperature in the range of 600°–1100° F. and conducive to oxidation of $SO_2$ to $SO_3$.

ARNOLD BELCHETZ.

REFERENCES CITED

The following references are of record in the file of this patent:

UNITED STATES PATENTS

| Number | Name | Date |
| --- | --- | --- |
| 1,355,105 | Canon | Oct. 5, 1920 |
| 1,473,879 | Rudolph | Nov. 13, 1923 |
| 2,337,684 | Scheinman | Dec. 28, 1943 |
| 2,373,008 | Becker | Apr. 3, 1945 |